Nov. 8, 1960 R. E. VON MEYER 2,959,293

RECORD HOLDER

Filed Nov. 7, 1957

INVENTOR.
RICHARD E. VON MEYER

BY

Barnes, Kisselle, Raisch & Choate

ATTORNEYS

United States Patent Office 2,959,293

Patented Nov. 8, 1960

2,959,293

RECORD HOLDER

Richard E. Von Meyer, 4706 Coles Manor, Apt. 5, Dallas 4, Tex.

Filed Nov. 7, 1957, Ser. No. 695,136

4 Claims. (Cl. 211—40)

This invention relates to record holders and particularly to a record holder for holding phonograph records in jackets.

It is an object of this invention to provide a record holder for holding records in record jackets which is relatively compact and which may be easily expanded to hold a plurality of record jackets in face-to-face contact.

It is a further object of this invention to provide such a record holder which is pleasing in appearance.

It is a further object of this invention to provide such a record holder which firmly holds the record jackets and prevents the records from warping.

Figures 1, 2, 3, 4:
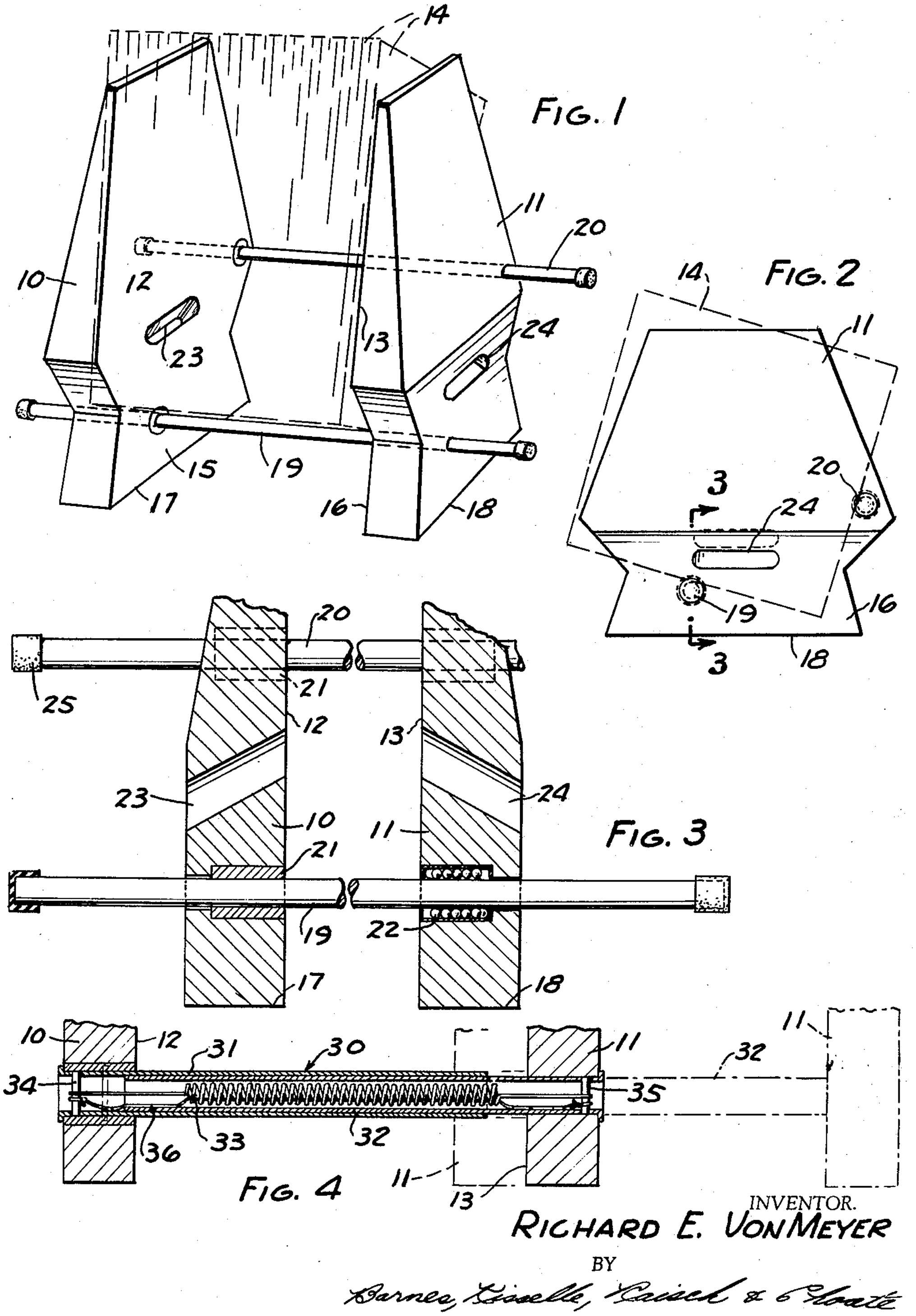
Fig. 1 is a perspective view of a record holder embodying the invention.
Fig. 2 is an end elevational view.
Fig. 3 is a fragmentary sectional view on an enlarged scale taken along the line 3—3 in Fig. 2, parts being broken away.
Fig. 4 is a fragmentary sectional view of a modified form of the invention.

Referring to Figs. 1 and 2, the record holder embodying the invention comprises end members 10, 11 having substantially flat vertical surfaces 12, 13 between which one or more generally rectangular record jackets 14 of cardboard or the like containing records are positioned.

The end members 10, 11 have bases 15, 16, the undersides 17, 18 of which are flat to provide a support when the record holder is placed on a flat surface. A pair of parallel cylindrical rods 19, 20 are slidably mounted in the end members 10, 11.

As shown in Fig. 3, a bushing 21 in end member 10 slidably mounts the rods 19, 20 in end member 10 while roller bearings 22 slidably mount the rods in member 11. By this arrangement each rod member is slidably mounted in the end members with less friction being provided by the member 11 than the member 10.

As shown in Fig. 2, rod 19 is mounted nearer the base of the end members than is rod 20. A handle slot 23, 24 is provided in the respective end members 10, 11 to form a means for grasping the end members and moving them inwardly and outwardly relative to each other.

The ends of the rods 19, 20 extend through the end members and caps 25 are provided on the ends.

The handle slots 23, 24 are provided nearer to the rod 19 than to the rod 20 and between the rods 19, 20 as shown in Fig. 2. The major portion of the end members extends above the rods.

In use, a plurality of record jackets 14 containing records are placed in the holder. The jackets are supported by the rods 19. 20 with one corner thereof projecting downwardly between the rods 19, 20.

The end members 10, 11 are then grasped by means of the handle slots 23, 24 and are moved toward one another causing the surfaces 12, 13 to contact the outer record jackets 14. When the end members are released, the record jackets tend to move outwardly providing a force on the surfaces 12, 13 which tends to rotate the end members relative to the rods. This causes the end members to be cammed or cocked relative to the rods, thus locking the position of the end members on the rods. In this manner the end members may be adjusted so that the record holder supports a small number or a large number of record jackets. The position of the handle slots 23, 24 adjacent the lower rod 19 facilitates the release of the end members from the rods and provides a means for easily moving the end members relative to the rods.

A modified form of the invention is shown in Fig. 4, wherein the record holder includes end members 10, 11 and a pair of rod assemblies 30. Each rod assembly 30 includes cylindrical tubes 31, 32. The end of each tube 31, 32 is secured in end members 10, 11, respectively, by suitable means. The size and shape of the tubes 31, 32 is such that the other ends thereof are telescoped. The end members are yieldingly urged toward one another by a tension spring 33. One end of the tension spring is fastened to tube 31 by being hooked on a transverse pin 34 and the other end of the tension spring is fixed to the tube 32 by being hooked over a transverse pin 35.

A flexible cord 36 has its ends connected to the pins 34, 35 and serves as a means for limiting the distance to which the end members 10, 11 may be moved away from one another. In this form of the invention the tube assemblies are positioned in the same position and with the same spacing as rods 19, 20 and the handle slots are positioned in the same relative locations.

The spring 33 serves to urge the end members 10, 11 toward one another and provide a force for holding the record jackets in position. The handle slots may be grasped in the same manner as in the previous form of the invention to move the end members 10, 11 apart, for example, to the dotted line position shown in Fig. 4.

It can thus be seen that I have provided a novel record holder for holding records in record jackets which is relatively compact and which may be easily expanded to hold a plurality of record jackets in face-to-face contact without any other means of support. The record holder is pleasing in appearance and firmly holds the record jackets to prevent the records from warping.

I claim:

1. A holder for generally square record jackets containing records comprising end members having adjacent vertically disposed surfaces between which a plurality of record jackets can be placed, each said member having a base portion, a pair of generally horizontal rod members extending between said end members in parallel relationship to one another, means in each end member for mounting each said rod for axial movement relative to said end member, one said means in one of said end members providing a lesser frictional force than said other means in the other said member, one said rod member being positioned at a greater distance above the base than another, said rod members being horizontally displaced, and handle means on each said end member adjacent said rod member which is nearest the base, whereby a plurality of record jackets may be supported on said rod members with a corner of each jacket extending downwardly between said rod members, said surfaces bearing against said record jackets to firmly hold said record jackets in face-to-face contact without any other means of support, said handle means comprising finger-receiving slots in each said end member, said one means providing lesser frictional force comprising a roller bearing and the other said means comprises a bushing.

2. A holder for generally square record jackets containing records comprising a pair of end members having base portions adapted to rest on a supporting surface, a pair only of horizontally and vertically spaced rod members extending between said end members in parallel relationship to one another, each said rod member being generally horizontal, means for mounting at least one end of each said rod member for axial movement relative to one of said end members, each said end member having a portion thereof in the area between said rod members and above the lower rod member adapted to be grasped for applying a force on said end members axially of said rod members and closely adjacent to said rod members for moving said end members relatively toward and away from each other, the major portion of each said end member extending upwardly above the plane containing said rod members and thereby providing a free and upstanding portion, said free portions being unconnected to one another and having vertically disposed jacket contacting surfaces which are spaced from the plane of said rod members sufficiently to produce a cocking of at least one of said end members relative to said rod members when said end members are released after having been brought into position with the jacket contacting surfaces thereof bearing against record jackets positioned between the end members so that the jackets are held firmly in face-to-face contact without any other means of support.

3. The combination set forth in claim 2 including means for mounting the other end of each said rod member in the other of said end members for axial movement relative thereto, said latter means providing lesser frictional resistance to said axial movement than said first means.

4. A holder for generally square record jackets containing records comprising a pair of end members having base portions adapted to rest on a supporting surface, a pair only of horizontally and vertically spaced rod assemblies extending between said end members in horizontal relationship to one another, each said rod assembly being generally horizontal, each said rod assembly comprising a pair of tubular members having their inner ends in telescoping relation, means for fixing the outer end of each said tubular member in an end member, means for yieldingly urging each pair of tubular members toward each other, each said end member having a portion thereof in the area between said rod assemblies and above the lower rod assembly adapted to be grasped for applying a force on said end members axially of said rod assemblies and closely adjacent to said rod assemblies for moving said end members relatively toward and away from each other, the major portion of each said end member extending upwardly above the plane containing said rod assemblies and thereby providing free and upstanding portions, said free portions being unconnected to one another and having vertically disposed jacket contacting surfaces which are spaced from the plane of said rod assemblies sufficiently to produce a cocking of at least one of said end members relative to said rod assemblies when said end members are released after having been brought into position with the jacket contacting surfaces thereof bearing against record jackets positioned between the end members so that the jackets are held firmly in face-to-face contact without any other means of support, and means for limiting the degree of extension of said tubular members comprising a flexible cord positioned within said tubular members and having one end thereof fastened to one tubular member and the other end thereof fastened to the other tubular member.

References Cited in the file of this patent

UNITED STATES PATENTS

| | | |
|---|---|---|
| 2,275,664 | Whitney | Mar. 10, 1942 |
| 2,510,077 | Coffman | June 6, 1950 |
| 2,545,844 | Cougias | Mar. 20, 1951 |

FOREIGN PATENTS

| | | |
|---|---|---|
| 261,537 | Great Britain | Nov. 25, 1926 |
| 507,354 | Great Britain | June 14, 1939 |
| 627,398 | Great Britain | Aug. 8, 1949 |